US005344161A

United States Patent [19]

Sandgren

[11] Patent Number: 5,344,161

[45] Date of Patent: Sep. 6, 1994

[54] SPRING FOR CENTERING TWO ANNULAR BODIES RELATIVE TO EACH OTHER

[75] Inventor: Jan Sandgren, Providence, R.I.

[73] Assignee: EG&G Sealol, Inc., Cranston, R.I.

[21] Appl. No.: 31,472

[22] Filed: Mar. 15, 1993

Related U.S. Application Data

[63] Continuation of Ser. No. 842,000, Feb. 28, 1992, abandoned.

[51] Int. Cl.[5] F16J 15/34

[52] U.S. Cl. 277/12; 277/38; 277/84; 277/85; 267/1.5

[58] Field of Search 277/12, 38, 39, 43, 277/81 R, 84, 85, 158; 267/1.5

[56] References Cited

U.S. PATENT DOCUMENTS

| | | | |
|---|---|---|---|
| 1,439,845 | 12/1922 | Seib et al. | 267/1.5 |
| 2,594,164 | 4/1952 | Hedberg | 267/1.5 |
| 3,559,725 | 10/1969 | Fucinari | 277/81 R |
| 3,837,631 | 9/1974 | Evans et al. | 267/1.5 |
| 3,973,780 | 8/1976 | Hornschuch | 277/81 R |
| 4,772,139 | 9/1988 | Bretton . | |
| 5,039,113 | 8/1991 | Gardner . | |

FOREIGN PATENT DOCUMENTS 3428744 2/1985 Fed. Rep. of Germany .

*Primary Examiner*—William A. Cuchlinski, Jr.
*Assistant Examiner*—Scott W. Cummings
*Attorney, Agent, or Firm*—Finnegan, Henderson, Farabow, Garrett & Dunner

[57] ABSTRACT

A spring centering device for centering two annular bodies relative to one another. The device including a spring (22) with a central spine (20) and multiple fingers (24) extending from the spine (20). Alternatively, the device includes a spring with a central axis including axially oriented elements (34) parallel to but displaced from the central axis, and connecting elements (24) structurally contiguous with an axial element on each side of the central axis.

2 Claims, 5 Drawing Sheets

4
4
24
22
50
20
24
5
5

38
40
44
42
46
22
22
48
48
48
22
36

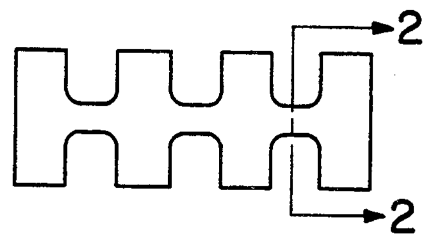
FIG. 1
PRIOR ART
FIG. 2
PRIOR ART
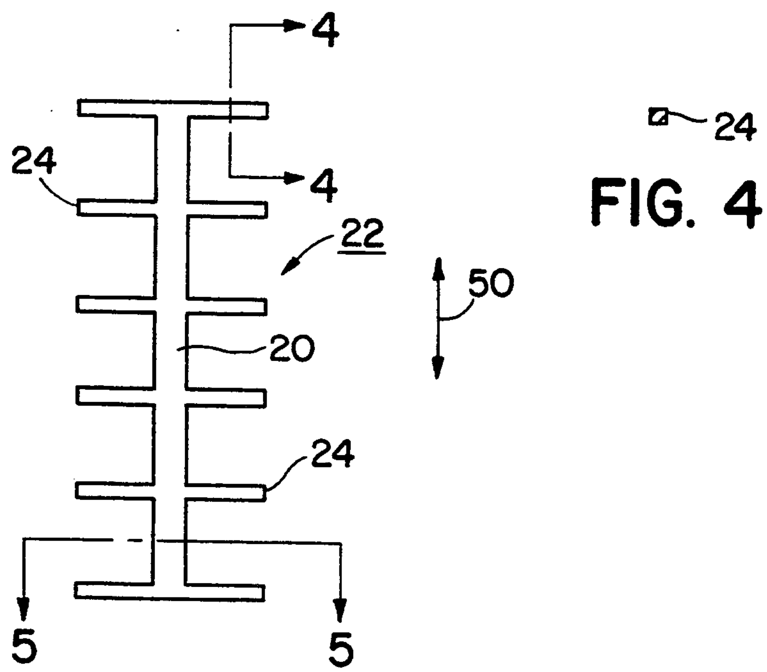
FIG. 4
FIG. 3
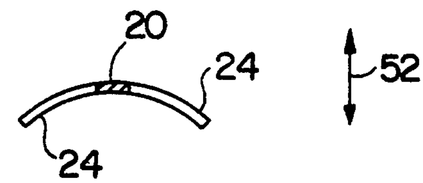
FIG. 5

54
24
Y
X
30
31
28
32
20
26

SPRING FOR CENTERING TWO ANNULAR BODIES RELATIVE TO EACH OTHER

This is a continuation of application Ser. No. 07/842,000, filed Feb. 28, 1992 now abandoned.

BACKGROUND OF THE INVENTION

1. Field of the Invention

The present invention relates to a spring for centering two annular bodies, and specifically relates to such a spring as used in a rotary seal.

2. Description of the Related Art

Various applications require that two rotating rings be mounted concentrically to each other. In many cases, unequal thermal or centrifugal expansion between the two rings, due to material and/or structural differences, requires that the rings be concentrically mounted with a gap therebetween in order to account for the expansion. The prior art has attempted various methods for such mounting including links connecting the rings, sliding connections between the rings, and springs between the rings.

U.S. Pat. No. 5,039,113 discloses an example of a device requiring the mounting of two concentric rings. In this patent, a rotary seal ring is mounted within a rotary seal ring carrier. A finger spring, shown in FIG. 1 of this application, is located between the ring carrier and the seal ring to center the seal ring but leave a gap so that relative thermal and centrifugal expansion may occur without breakage of the seal ring. In-depth analysis of the finger spring disclosed in U.S. Pat. No. 5,039,113, has shown that the centering capability of the spring is limited to only a small portion of the estimated working range of spring deflection due to the effects of friction. It is therefore desirable to have an improved centering spring for use in such seals or other applications requiring the centering of two ring-shaped bodies, which for the purposes of this invention may include one solid annular body such as a shaft.

SUMMARY OF THE INVENTION

An object of the invention is to overcome the deficiencies in the prior art. Further objects of the invention include extending the spring centering capability of a finger spring to the total working range of spring deflection.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

To achieve the objects and in accordance with the purposes of the invention, as embodied and broadly described herein, the invention comprises a spring comprising an elongated central spine forming a contact surface, the spine being elongated along one axis thereof; and multiple fingers extending from the spine and arcing away from the contact surface, the fingers being elongated along an axis transverse to the elongated axis of the spine, wherein each finger has an area cross-sectional to its elongated axis which is smaller than an area of said spine which is cross-sectional to ice elongated axis.

Furthermore, to achieve the objects in accordance with the purposes of the invention, as embodied and broadly described herein, the invention comprises a spring having a centerline forming an axis in a contact plane, comprising axially-oriented elements parallel to but displaced from the centerline, the axially-oriented elements being axially spaced from each other and alternately displaced to different sides of the centerline; and connecting elements structurally contiguous with an axial element on each side of the centerline, each connecting element having an elongated axis transverse to the centerline, wherein the ends of the connecting elements along the elongated axis are displaced from the contact plane of the centerline.

It is to be understood that both the foregoing general description and the following detailed description are exemplary and explanatory only and are not restrictive of the invention, as claimed.

BRIEF DESCRIPTION OF THE DRAWINGS

The accompanying drawings which are incorporated in and constitute a part of this specification, illustrate several embodiments of the invention and together with the description serve to explain the principles of the invention.

FIG. 1 depicts a prior art spring.

FIG. 2 is a cross-sectional view of the spring of FIG. 1 taken at section 2—2.

FIG. 3 depicts a spring according to a first embodiment of the invention.

FIG. 4 is a cross-sectional view of the spring of FIG. 3 taken at section 4—4.

FIG. 5 is a cross-sectional view of the spring of FIG. 3 taken at section 5—5.

FIG. 8 is a cross-sectional view of the spring of FIG. 6 taken at section 8—8.

DESCRIPTION OF THE PREFERRED EMBODIMENTS

Figure 6:
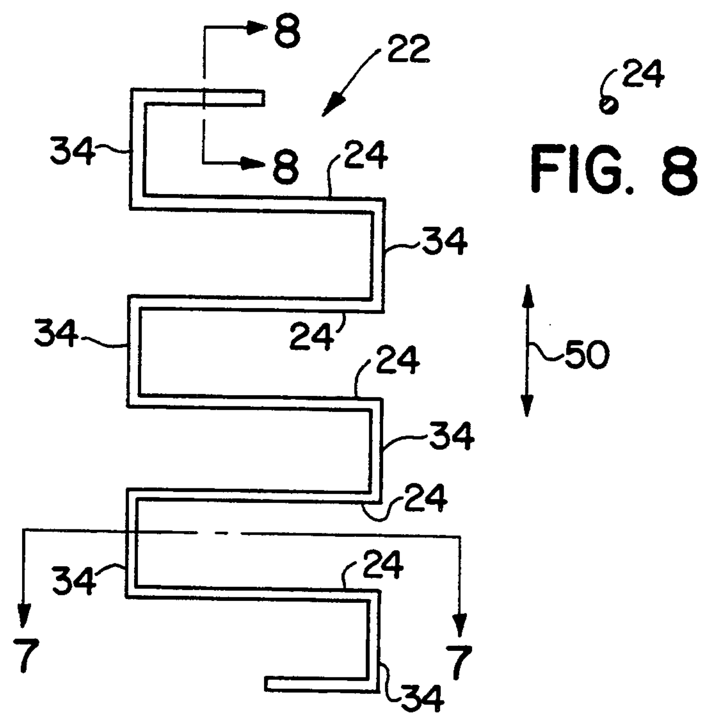
FIG. 6 depicts a spring according to a second embodiment of the invention.

Reference will now be made in detail to the presently preferred embodiments of the invention, examples of which are illustrated in the accompanying drawings. Wherever possible, the same reference numerals will be used throughout the drawings to refer to the same or like parts.

In accordance with a first embodiment of the invention, a spring includes a central spine forming a contact plane, said spine being elongated along one axis thereof. As embodied in FIG. 3, a spine 20 extends along a central axis of a spring 22. While, as understood by those of ordinary skill in the art, the dimensions of the spring change in response to the circumference of the annular body being centered and the desired centering force, in a currently preferred embodiment, the spine is at least several inches in length and has a rectangular cross-section. A preferred material for the spine is 17-7 PH Steel. However, other materials such as spring steel or Inconel 718 may be used depending on the corrosiveness of the environment.

In accordance with the first embodiment of the invention, the spring further includes multiple fingers extending from the spine and arcing out of the contact plane, the fingers being elongated along an axis substantially orthogonal to the elongated axis of the spine, wherein each finger has an area cross-sectional to its elongated axis which is smaller than an axis of said spine which is cross-sectional to its elongated axis. As embodied herein and shown in FIG. 3, legs 24 extend from the spine 20 and are curved out of the contact surface 31 (shown in FIG. 9) formed by the spine. Preferably, spring 22 is of uniform thickness, including both the spine 20 and the fingers 22, and the width of the fingers is narrower than the width of the spine. Further preferably, the entire spring, including fingers 24 and the spine 20, are formed simultaneously of the same material, which as stated above is preferably 17-7 PH Steel.

Figure 9:
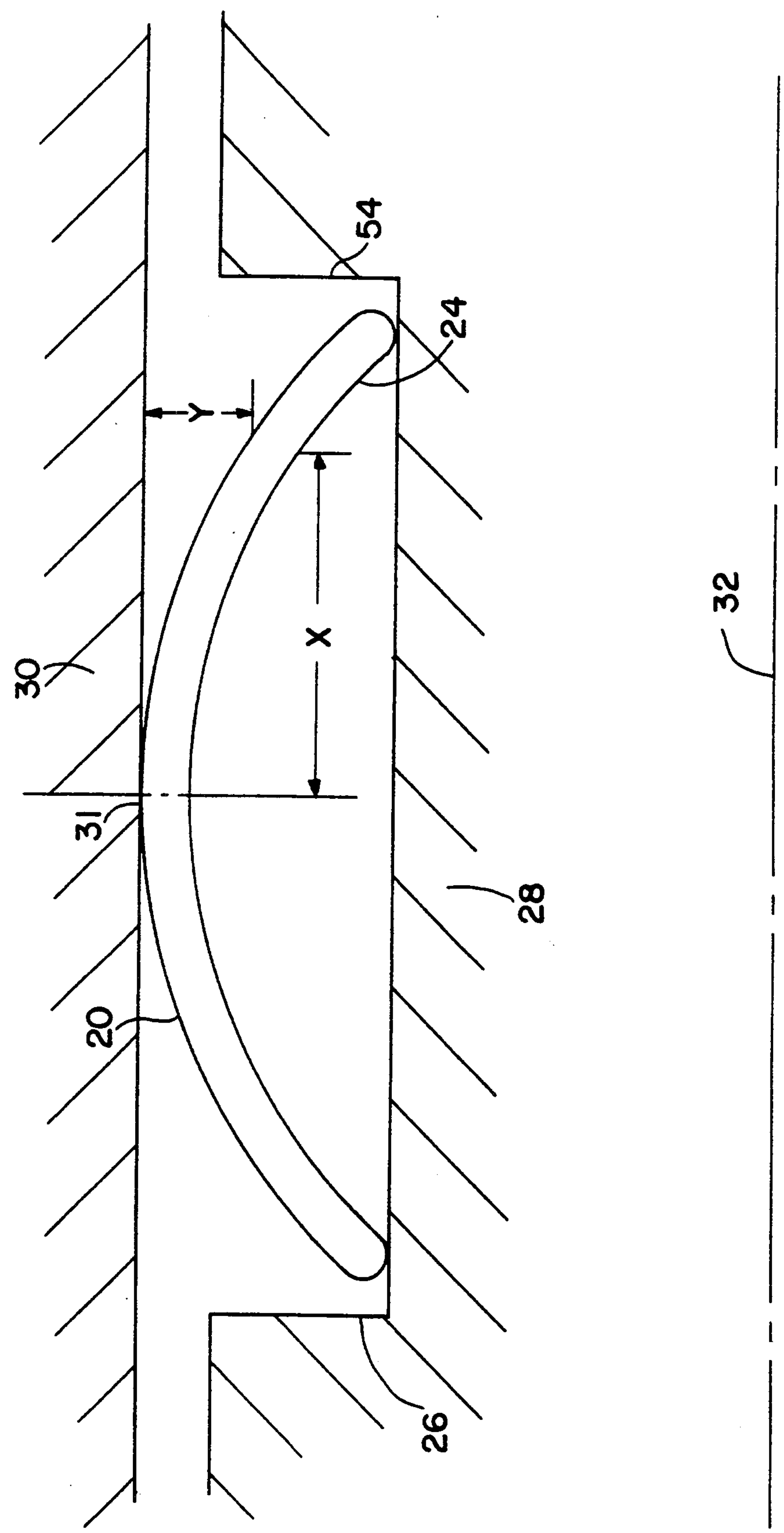
FIG. 9 depicts the curvature of a spring according to either the first or second embodiment of the invention.

As shown in FIG. 9 for both the present embodiment and a later discussed embodiment, the arc of the fingers out of the plane of the spine is preferably defined by the relationship $Y=kX^n$. In FIG. 9, the spring 20 is located in a groove 26 formed in annular body 28, below annular body 30. It should be noted that FIG. 9 shows only the upper cross-section of bodies 28 and 30, those bodies being symmetrical about a center of rotation 32. The value X, as shown in FIG. 9, is the distance from the centerline to a location on the finger 24, Y is the distance from the contact plane 31 of the spring to the X location, and k and n are constants. Most preferably, n is close to 2.

In accordance with a second embodiment of the invention, a spring having 8 centerline forming an axis in a contact plane includes axially-oriented elements parallel to but displaced from the centerline, the axially oriented elements being axially spaced from each other and alternately displaced to different sides of the centerline. As embodied herein and shown in FIG. 6, axially oriented elements 34 are alternately located on either side of the centerline.

In accordance with the second embodiment of the invention, the spring further includes connecting elements structurally contiguous with an axial element on each side of the centerline, each connecting element having an elongated axis substantially orthogonal to the centerline, wherein the ends of each connecting element along the elongated axis are displaced from the plane of the centerline.

As embodied herein and shown in FIG. 6, connecting elements 24 connect the axially oriented elements 34 and are curved out of contact plane 31 (shown in FIG. 9) of the centerline. Preferably, the connecting elements and the axial elements are integrally formed of the same material, which is further preferably a wire made of 17-7 PH Steel. However, as discussed for the first embodiment, other material may be used. The spring according to the second embodiment is determined by the circumference of the annular body it centers and is preferably at least several inches long. The spring may have either a circular or rectangular cross-section throughout.

A currently preferred diameter for the spring material having a circular cross-section is 0.0270 inches. Such a spring has a preferred overall width (separation between alternating axial elements) of approximately 0.325 or 0.449 inches, with a preferred spacing between connecting elements of 0.167 inches. Currently preferred springs having a rectangular cross-section range between 0.018 and 0.031 inches thick, with a width of between 0.90 and 0.115 inches. Such springs have a preferred overall width of 0.300 to 0.457 inches and a preferred spacing between connecting elements of 0.109 to 0.135 inches.

The curve of the connecting element 34 is preferably defined by the same relationship $Y=kX^n$, discussed above with respect to FIG. 9, where the value X is the distance from the centerline to a location on the connecting element 4, Y is the displacement of the connecting element 24 from the contact plane of the centerline at the location X, and k and n are constants. Most preferably, n is close to 2.

In operation, a spring according to either the first or second embodiment of the invention can be located between two concentric annular bodies, as discussed by example in U.S. Pat. No. 5,039,113, issued to Gardner on Aug. 13, 1991, for a Spiral Groove Gas Lubricated Seal, which is incorporated by reference herein.

Figure 10:
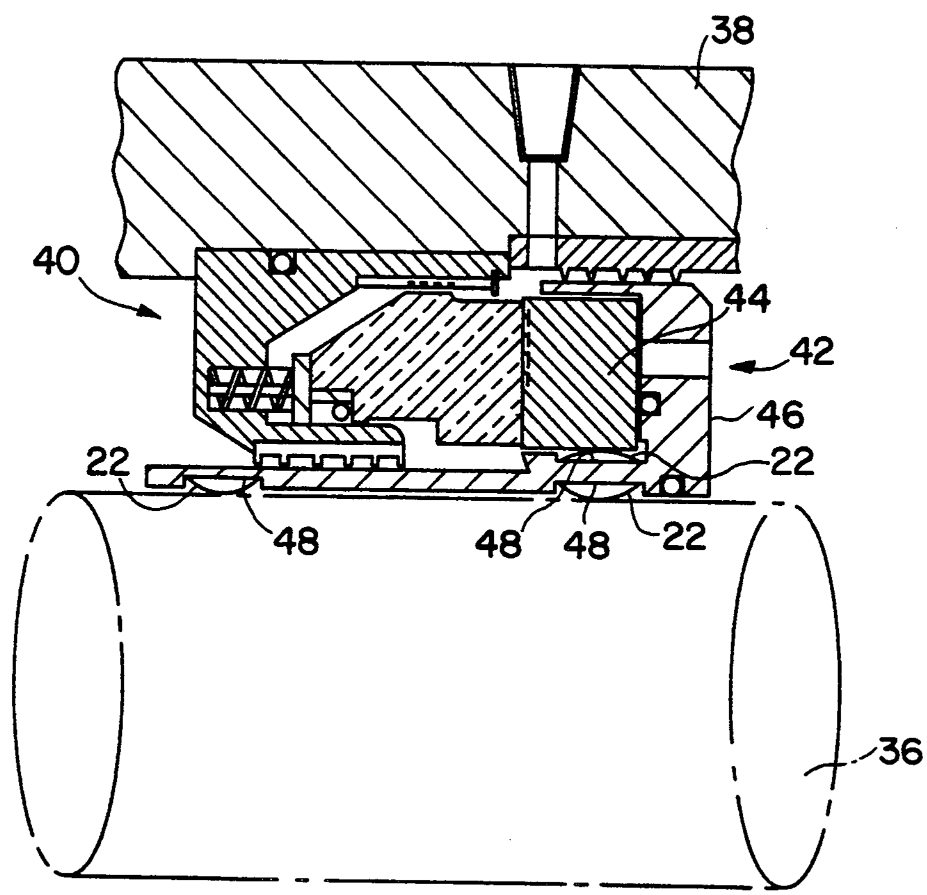
FIG. 10 depicts a half-view of a cross-section of a seal assembly using a spring according to the invention.

FIG. 10 of this application shows an example of a seal using a spring according to the present invention. A shaft 36 is mounted within a housing 38, and a stationary seal ring assembly 40 is attached to the housing. A rotary seal ring assembly 42 is attached to the shaft 36. In the rotary seal ring assembly, a rotary seal ring 44 is mounted within a rotary seal ring retainer 46. Such a seal assembly requires concentric mounting of several rotatable annular bodies including shaft 36, retainer 46 and seal ring 44. Such mounting is preferably done by mounting springs 22, according to the invention, in grooves 48.

Figure 7:
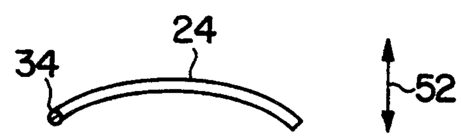
FIG. 7 is a cross-sectional view of the spring of FIG. 6 taken at section 7—7.

The benefits of a spring 22 according to the invention may be explained (although the invention is not limited to a spring operating according to this explanation) by the principle that each spring is made so flexible in the tangential direction (depicted by arrow 50 in FIGS. 3 and 6), that the tangential bending or torsional force is less than the frictional force between the spring finger (or axially-oriented element) 24 and the annular body which it contacts (28, 46). If the self-centering spring force from the radial deflection (shown by arrow 52 in FIGS. 5 and 7) of the spring is $F_{RS}$, and the resisting friction force in direction 50 between the spring and the annular body is $F_F$ and the self-centering spring force from the tangential deflection of the spring leg is $F_{TS}$, then the resulting centering force for a spring according to the invention may be characterized as $F_R=F_{RS}+F_{TS}$. On the other hand, for the prior art finger spring shown in FIG. 1, where the width of the finger is greater than the width of the spine, the centering force is given by the equation $F_R=F_{RS}-F_F$. As can be seen from these formulas, in the invention, the centering force constitutes a greater proportion of the actual spring force due to the substantial elimination of the resisting frictional force $F_F$.

Figure 11:
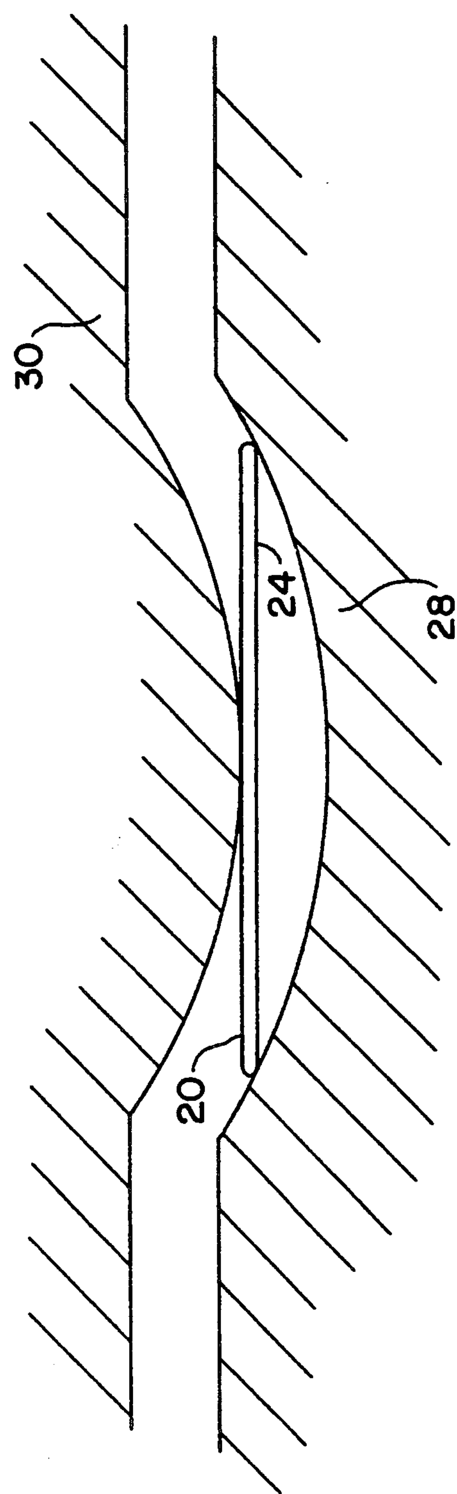
FIG. 11 depicts an alternative to the spring curvature shown in FIG. 9.

The actual operation of the spring element is controlled by the physical dimensions of the spring which can be chosen to suit a particular application, as will be appreciated by those of ordinary skill in the art. Also, the operation is controlled by the form of the space between the spring leg and the supporting ring section as shown in FIG. 9. The desired form can be accomplished by shaping the spring, as discussed above, or alternatively by shaping the supporting walls of bodies 28 and 30 to have this curvature as shown in FIG. 11, or by a combination of the spring shape and supporting wall shape which obtains the desired gap.

It will be apparent to those skilled in the art that various modifications and variations can be made in the centering spring and its application, and in construction of the spring without departing from the scope or spirit of the invention. It will be especially obvious to those of ordinary skill in the art that such a finger spring could be used in many applications for centering two annular bodies besides the specific example of a seal, given above.

Other embodiments of the invention will be apparent to those skilled in the art from consideration of the specification and practice of the invention disclosed herein. It is intended that the specification and examples be considered as exemplary only, with the true and scope of the invention being indicated by the following claims.

What is claimed:

1. A ring carrier for holding a ring, the carrier comprising:

an annular body;

an annular pocket formed in said annular body for holding the ring, said pocket having a bottom, a radially inner wall, and a radially outer wall;

an annular groove formed in said radially inner wall of said pocket; and a spring in said annular groove, the spring including a central spine, said spine being elongated along one axis thereof and multiple fingers extending from the spine, said fingers being elongated along an axis substantially orthogonal to the elongated axis of the spine, wherein each of the fingers has an area cross-sectional to its elongated axis which is smaller than an area of said spine which is cross-sectional to its elongated axis, whereby the spring serves to center the ring regardless of the relative thermal expansion between the ring and the carrier.

2. A shaft attachment system for attaching an annular body to a shaft, the attachment system comprising:

an annular portion of the annular body, said annular portion extending along the shaft and adapted for fitting over the shaft, said annular portion having a radially inner surface adjacent to but spaced from the shaft; and means for maintaining fit of the annular body to the shaft regardless of the relative thermal and centrifugal expansion therebetween, wherein said means for maintaining fit comprises an annular pocket formed in said radially inner surface and a spring located in said pocket for pressing against the shaft and the radially inner surface of the annular portion, the spring including a central spine, said spine being elongated along one axis thereof and multiple fingers extending from the spine, said fingers being elongated along an axis substantially orthogonal to the elongated axis of the spine, wherein each finger has an area cross-sectional to its elongated axis which is smaller than an area of said spine which is cross-sectional to its elongated axis.

* * * * *